(12) United States Patent
Kudo

(10) Patent No.: US 11,203,339 B2
(45) Date of Patent: Dec. 21, 2021

(54) VEHICLE CONTROLLING APPARATUS

(71) Applicant: SUBARU CORPORATION, Tokyo (JP)

(72) Inventor: Shinya Kudo, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 384 days.

(21) Appl. No.: 16/432,690

(22) Filed: Jun. 5, 2019

(65) Prior Publication Data

US 2020/0094831 A1    Mar. 26, 2020

(30) Foreign Application Priority Data

Sep. 26, 2018   (JP) .................................. 2018-180464

(51) Int. Cl.
*B60W 30/17* (2020.01)
*B60W 10/04* (2006.01)
(Continued)

(52) U.S. Cl.
CPC ............ *B60W 30/17* (2013.01); *B60W 10/04* (2013.01); *B60W 10/10* (2013.01); *B60W 10/18* (2013.01);
(Continued)

(58) Field of Classification Search
CPC ...... B60W 10/04; B60W 10/10; B60W 10/18; B60W 2552/00; B60W 2554/4023;
(Continued)

(56) References Cited

U.S. PATENT DOCUMENTS

2004/0003951 A1*  1/2004  Kikuchi ............... G01S 7/4052
                                                      180/169
2004/0010362 A1*  1/2004  Michi .................. B60W 30/16
                                                      701/93
(Continued)

FOREIGN PATENT DOCUMENTS

JP    2009-031873 A    2/2009
JP    2011-126406 A    6/2011
(Continued)

OTHER PUBLICATIONS

Japanese Office Action, dated Jan. 21, 2020, in Japanese Application No. 2018-180464 and English Translation thereof.

*Primary Examiner* — Babar Sarwar
(74) *Attorney, Agent, or Firm* — McGinn IP Law Group, PLLC

(57) ABSTRACT

A vehicle controlling apparatus includes a setting unit and an acquiring unit. The setting unit is configured to set a target inter-vehicle distance. The acquiring unit is configured to acquire position information of a temporary stopping location on a traveling route on which an own vehicle travels. The setting unit is configured to, on a condition that the own vehicle travels to follow a preceding vehicle, and that the acquiring unit has acquired the position information of the temporary stopping location, make a setting change to make the target inter-vehicle distance greater than a normal setting value when a distance from the own vehicle to the temporary stopping location reaches a predetermined distance, and make a setting change to bring the target inter-vehicle distance closer to the normal setting value in accordance with the distance until the own vehicle reaches the temporary stopping location.

17 Claims, 8 Drawing Sheets

(51) Int. Cl.
  *B60W 10/10* (2012.01)
  *B60W 10/18* (2012.01)
(52) U.S. Cl.
  CPC ... *B60W 2554/801* (2020.02); *B60W 2555/60* (2020.02); *B60W 2754/30* (2020.02)
(58) Field of Classification Search
  CPC ..... B60W 2554/408; B60W 2554/801; B60W 2555/60; B60W 2754/30; B60W 30/16; B60W 30/17; B60W 50/0097; B60W 50/087; B60W 60/0023
  See application file for complete search history.

(56) References Cited

U.S. PATENT DOCUMENTS

| | | | | |
|---|---|---|---|---|
| 2013/0317719 | A1* | 11/2013 | Ham | B60W 30/17 701/96 |
| 2015/0232094 | A1* | 8/2015 | Sudou | B60W 30/143 701/93 |
| 2015/0304954 | A1* | 10/2015 | Korenaga | H04W 52/0254 370/311 |
| 2016/0257288 | A1* | 9/2016 | Miller | B60T 8/17 |
| 2016/0332624 | A1* | 11/2016 | Tezuka | G08G 1/123 |
| 2016/0362105 | A1* | 12/2016 | Kwon | G01C 21/26 |
| 2017/0043767 | A1* | 2/2017 | Khafagy | B60W 10/06 |
| 2017/0080940 | A1* | 3/2017 | Ito | B60W 30/16 |
| 2017/0253240 | A1* | 9/2017 | Kishida | B60W 50/087 |
| 2017/0361841 | A1* | 12/2017 | Kojo | B60W 30/0956 |
| 2018/0009439 | A1* | 1/2018 | Park | B60W 50/14 |
| 2018/0009440 | A1* | 1/2018 | Kozuka | B60W 30/143 |
| 2018/0066748 | A1* | 3/2018 | Hu | F16H 61/0213 |
| 2018/0170351 | A1* | 6/2018 | Aoki | B60W 30/192 |
| 2018/0222480 | A1* | 8/2018 | Shokonji | B60W 50/14 |
| 2018/0281789 | A1* | 10/2018 | Oyama | B60W 10/18 |
| 2018/0281790 | A1* | 10/2018 | Oyama | B60W 10/18 |
| 2018/0281791 | A1* | 10/2018 | Fukaya | B60W 30/0956 |
| 2018/0281793 | A1* | 10/2018 | Terayama | B60W 30/09 |
| 2018/0312164 | A1* | 11/2018 | Sasabuchi | B60W 30/17 |
| 2018/0319402 | A1* | 11/2018 | Mills | B60W 30/10 |
| 2019/0061758 | A1* | 2/2019 | Ide | B60K 31/0008 |
| 2019/0084557 | A1* | 3/2019 | Nakade | B60W 10/18 |
| 2019/0210604 | A1* | 7/2019 | Limbacher | B60W 30/18072 |
| 2019/0232964 | A1* | 8/2019 | Lindholm | G06T 7/50 |

FOREIGN PATENT DOCUMENTS

| | | |
|---|---|---|
| JP | 2012-121405 A | 6/2012 |
| JP | JR 2015-147525 A | 8/2015 |
| WO | WO 2018/173175 A1 | 9/2018 |

* cited by examiner

VEHICLE CONTROLLING APPARATUS

CROSS-REFERENCE TO RELATED APPLICATIONS

The present application claims priority from Japanese Patent Application No. 2018-180464 filed on Sep. 26, 2018, the entire contents of which are hereby incorporated by reference.

BACKGROUND

The technology relates to vehicle controlling apparatuses that perform travel control of vehicles and relates, in particular, to vehicle controlling apparatuses provided with an auto cruise control function.

Auto cruise control is widely known as one type of travel control of vehicles. In the auto cruise control, the speed of an own vehicle is so controlled as to satisfy a traveling condition specified, for example, by the driver.

Known examples of the auto cruise control include "constant-speed travel control" and "following travel control." In the constant-speed travel control, the speed of an own vehicle is maintained constant at a set vehicle speed that is based on the driver operation. In the following travel control, when a preceding vehicle traveling in front of an own vehicle is detected, the own vehicle is made to follow this preceding vehicle.

The following travel control has been put into practical use in the form of adaptive cruise control (ACC). In the ACC, while a preceding vehicle traveling in front of an own vehicle is being detected, the own vehicle is controlled to follow this preceding vehicle if the speed of the own vehicle is equal to or lower than a set vehicle speed, or the own vehicle is controlled to travel at a constant speed, i.e., at a set vehicle speed, in a case where the speed of the own vehicle would go over the set vehicle speed if the own vehicle followed the preceding vehicle. While no preceding vehicle is being detected, the own vehicle is controlled to travel at a constant speed, i.e., at a set vehicle speed.

While the ACC is being executed, target acceleration (acceleration/deceleration) is set in accordance with information on a preceding vehicle, such as the relative velocity of the own vehicle with respect to the preceding vehicle, or a speed deviation of the speed of the own vehicle from a set vehicle speed; a requested torque corresponding to the target acceleration is calculated; control such as lift control of an electronically controlled throttle valve (engine output control) or brake control is performed in accordance with the requested torque; and the acceleration corresponding to the target acceleration is generated.

Japanese Unexamined Patent Application Publication No. 2012-121405 discloses one technique in which the position of a stop line is acquired, and an amount of change in jerk is regulated when an own vehicle is to stop at the stop line following a preceding vehicle during ACC control.

SUMMARY

An aspect of the technology provides a vehicle controlling apparatus that includes a setting unit and an acquiring unit. The setting unit is configured to set a target inter-vehicle distance, and the target inter-vehicle distance is one of traveling conditions in auto cruise control, the auto cruise control being configured to control a speed of an own vehicle to satisfy the set traveling conditions. The acquiring unit is configured to acquire position information of a temporary stopping location on a traveling route on which the own vehicle travels. The setting unit is configured to, on a condition that the own vehicle travels to follow a preceding vehicle, and that the acquiring unit has acquired the position information of the temporary stopping location, make a setting change to make the target inter-vehicle distance greater than a normal setting value when a distance from the own vehicle to the temporary stopping location reaches a predetermined distance, and make a setting change to bring the target inter-vehicle distance closer to the normal setting value in accordance with the distance until the own vehicle reaches the temporary stopping location.

An aspect of the technology provides a vehicle controlling apparatus that includes circuitry configured to set a target inter-vehicle distance, the target inter-vehicle distance being one of traveling conditions in auto cruise control, the auto cruise control being configured to control a speed of an own vehicle to satisfy the set traveling conditions, and to acquire position information of a temporary stopping location on a traveling route on which the own vehicle travels. The circuitry is configured to, on a condition that the own vehicle travels to follow a preceding vehicle, and that the position information of the temporary stopping location has been acquired, make a setting change to make the target inter-vehicle distance greater than a normal setting value when a distance from the own vehicle to the temporary stopping location reaches a predetermined distance, and make a setting change to bring the target inter-vehicle distance closer to the normal setting value in accordance with the distance until the own vehicle reaches the temporary stopping location.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

Figure 1:
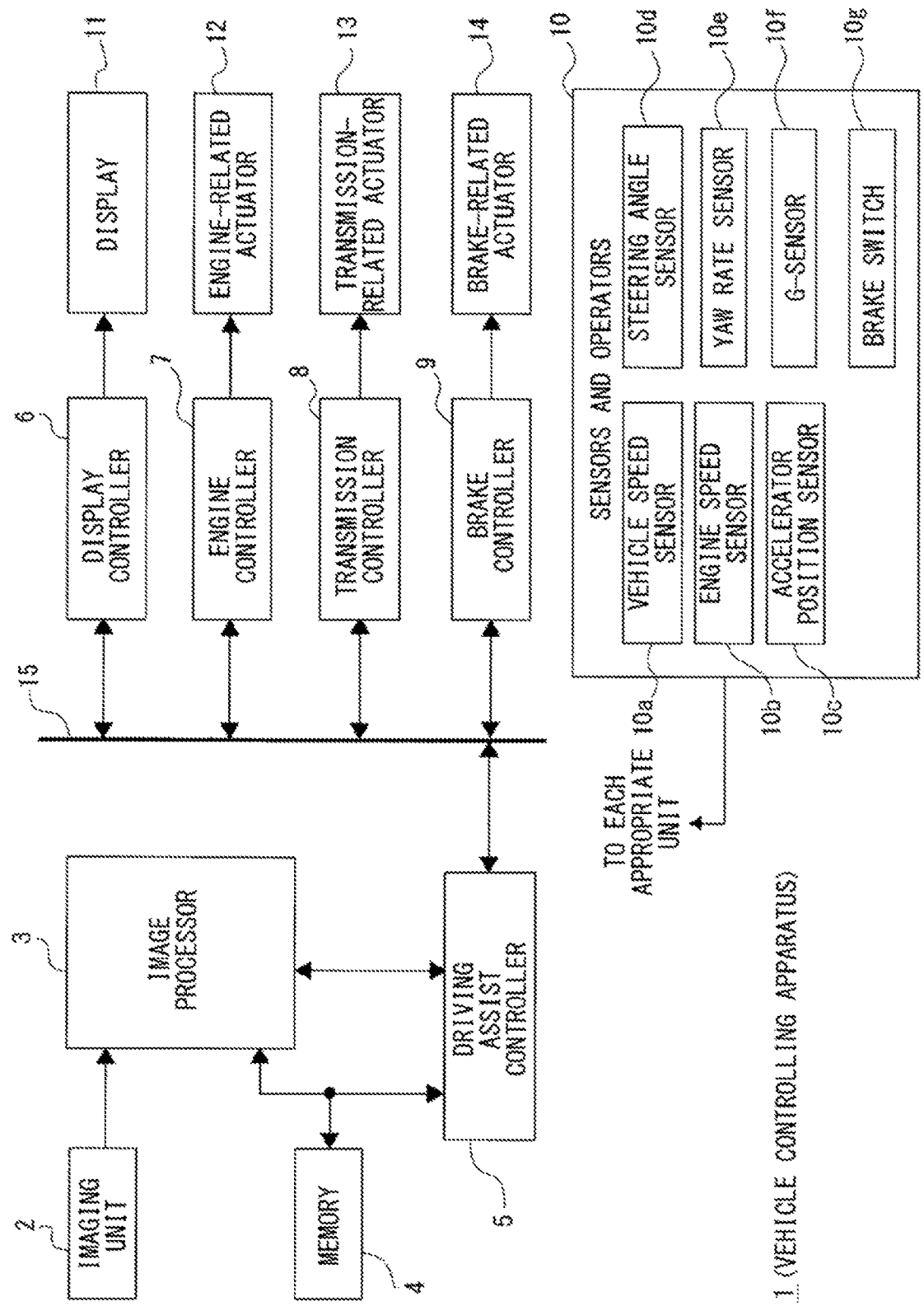
FIG. 1 is a block diagram illustrating an example of a vehicle controlling apparatus according to an embodiment of the technology.

In the following, some example embodiments of the technology are described with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. Throughout the present specification and the drawings, elements having substantially the same function and configuration are denoted with the same numerals to avoid any redundant description.

In a situation in which an own vehicle is following a preceding vehicle through the ACC control described above, as the own vehicle accommodates to the acceleration and deceleration of the preceding vehicle, the ride may become uncomfortable, or the fuel efficiency may decrease.

In other words, since the target inter-vehicle distance in typical following control is set on the basis of, for example, the relative velocity of an own vehicle with respect to a preceding vehicle, unnecessary acceleration and deceleration may possibly be generated when the own vehicle comes to a temporary stop or passes through a railroad crossing in congested traffic, and this can negatively affect the fuel efficiency or the comfort of the ride.

It is desirable to achieve control that, in a case where an own vehicle is being controlled to follow a preceding vehicle, keeps the comfort of the ride or the fuel efficiency from decreasing even if a stopping location, such as a temporary stop, is present.

Configuration of Vehicle Controlling Apparatus

FIG. 1 is a block diagram illustrating an example of a general configuration of a vehicle controlling apparatus 1 according to an embodiment of the technology. In FIG. 1, of the configuration of the vehicle controlling apparatus 1, only a configuration of a main portion pertaining to an embodiment of the technology is illustrated.

The vehicle controlling apparatus 1 may include an imaging unit 2, an image processor 3, a memory 4, a driving assist controller 5, a display controller 6, an engine controller 7, a transmission controller 8, a brake controller 9, sensors and operators 10, a display 11, an engine-related actuator 12, a transmission-related actuator 13, a brake-related actuator 14, and a bus 15, and these components may be provided for an own vehicle.

The image processor 3 may include, for example, a microcomputer that includes, for example but not limited to, a central processing unit (CPU), a read-only memory (ROM), and a random-access memory (RAM). The image processor 3 may execute a predetermined image process for recognizing an environment outside the own vehicle with the use of picked-up image data obtained as the imaging unit 2 picks up an image of a space in a traveling direction of the own vehicle. The traveling direction of the own vehicle may be a forward direction in this example. The image processor 3 may perform the image process with the use of the memory 4, for example. The memory 4 may be, for example, a non-volatile memory.

The imaging unit 2 may include two camera units. The camera units may each include a camera optical system and an imaging element, such as a charge-coupled device (CCD) or a complementary metal-oxide semiconductor (CMOS). An object image may be formed on an imaging surface of the imaging element by the camera optical system, and an electric signal corresponding to a quantity of received light may be obtained in each pixel.

The camera units may each be so disposed as to be able to find the range through a so-called stereo imaging technique. Electric signals obtained in each camera unit may be subjected to A/D conversion and/or a predetermined correction process, and the resulting signals may be supplied to the image processor 3 in the form of digital image signals (picked-up image data) each representing a luminance value in a predetermined gray-scale on a corresponding pixel.

The image processor 3 may execute various image processes that are based on the picked-up image data obtained through stereo imaging, recognize forward direction information, such as three-dimensional object data in front of the own vehicle or lane line data, and estimate an own vehicle traveling route on the basis of, for example but not limited to, these pieces of recognition information. Furthermore, the image processor 3 may detect a preceding vehicle traveling on the own vehicle traveling route on the basis of, for example but not limited to, the recognized three-dimensional object data.

In a specific but non-limiting example, the image processor 3 may perform the following process, for example, as a process that is based on the picked-up image data obtained through stereo imaging. The image processor 3 may first generate distance information through the principle of triangulation from a displacement amount (parallax) between corresponding positions in a picked-up image pair serving as the picked-up image data. The image processor 3 may thereafter perform a well-known grouping process on the distance information and compare the distance information subjected to the grouping process against, for example but not limited to, prestored three-dimensional road shape data and/or three-dimensional object data. Thus, the image processor 3 may extract, for example but not limited to, lane line data; side wall data, such as a guardrail or a curbstone present along the road; three-dimensional object data, such as a vehicle; a stop line; a traffic light; and a railroad crossing.

Furthermore, the image processor 3 may estimate the own vehicle traveling route on the basis of, for example but not limited to, the lane line data and/or the side wall data and extract (detect), as a preceding vehicle, a three-dimensional object that is present on the own vehicle traveling route and that moves at a predetermined speed in a direction substantially the same as the direction in which the own vehicle is moving. The predetermined speed may be, for example, equal to or higher than 0 Km/h. In a case where the image processor 3 has detected a preceding vehicle, the image processor 3 may calculate, as preceding vehicle information on that preceding vehicle, an inter-vehicle distance cd, a relative velocity ds, a preceding vehicle speed ss, and a preceding vehicle acceleration sac. The inter-vehicle distance cd may be an inter-vehicle distance from the own vehicle to the preceding vehicle. The relative velocity ds may be the rate of change in the inter-vehicle distance cd. The preceding vehicle speed ss may be calculated by adding the relative velocity ds and an own vehicle speed js. The preceding vehicle acceleration sac may be a derivative value of the preceding vehicle speed ss. The own vehicle speed js may be a traveling speed of the own vehicle that is detected by a vehicle speed sensor 10a described later. The own vehicle speed js may be referred to as an "actual vehicle speed" as oppose to a set vehicle speed St described later. Of preceding vehicles, if there is a preceding vehicle that has a preceding vehicle speed ss of equal to or lower than a predetermined value (e.g., equal to or lower than 4 Km/h) and that is not accelerating, the image processor 3 may recognize this preceding vehicle as a preceding vehicle that is substantially at halt.

In addition, from an image recognized as a preceding vehicle, the image processor 3 may be able to calculate the height of that preceding vehicle.

The image processor 3 may calculate the above-described preceding vehicle information for each frame of the picked-up image data, for example, and successively store the calculated preceding vehicle information into the memory 4.

It may be conceivable that the imaging unit 2 further includes a camera that picks up an image of a space behind the own vehicle, in addition to the camera that picks up an image of a space in front of the own vehicle. For example, as the imaging unit 2 includes two cameras that are directed rearward of the own vehicle, the image processor 3 may be able to calculate an inter-vehicle distance from the own vehicle to a subsequent vehicle with the use of the picked-up image data from the two cameras.

The driving assist controller 5 may include, for example, a microcomputer that includes, for example but not limited to, a CPU, a ROM, and a RAM. The driving assist controller 5 may execute various control processes for driving assist on the basis of, for example but not limited to, the result, held in the memory 4, of the image process performed by the image processor 3 and detection information and operation input information obtained by the sensors and operators 10. The various control processes may be referred to as "driving assist control processes," hereinafter. The driving assist controller 5 may be coupled to each of the display controller 6, the engine controller 7, the transmission controller 8, and the brake controller 9 via the bus 15, and this configuration may allow each of the stated controllers to perform data communication with each other. The display controller 6, the engine controller 7, the transmission controller 8, and the brake controller 9 may each include a microcomputer. The driving assist controller 5 may issue an instruction to a necessary controller of the aforementioned controllers to cause that controller to execute an operation pertaining to the driving assist.

The driving assist controller 5 according to an embodiment may perform auto cruise control as one of the driving assist control processes. In other words, the driving assist controller 5 may control the speed of the own vehicle to satisfy a specified traveling condition. In a specific but non-limiting example, the driving assist controller 5 of this example may perform a process for achieving adaptive cruise control (ACC) as the auto cruise control.

In the ACC, a target vehicle speed St and a target inter-vehicle distance Dt may be set on the basis of an operation input of a predetermined operator provided in the sensors and operators 10.

Hereinafter, the "target vehicle speed St" may be referred to as the "set vehicle speed St."

The driving assist controller 5 may perform constant-speed travel control in the ACC in a case where no preceding vehicle is being detected. In the constant-speed travel control, the driving assist controller 5 may cause the own vehicle speed js to converge to the set vehicle speed St.

Meanwhile, the driving assist controller 5 may perform following travel control in a case where a preceding vehicle has been recognized during the constant-speed travel control. In the following travel control, the driving assist controller 5 may cause the inter-vehicle distance cd from the own vehicle to the recognized preceding vehicle to converge to the target inter-vehicle distance Dt. The following travel control may include stopping following the preceding vehicle and starting to move following the preceding vehicle.

In a specific but non-limiting example, the driving assist controller 5 may, for example, calculate the vehicle speed deviation (e.g., St−js) of the own vehicle speed js relative to the set vehicle speed St and calculate a candidate target acceleration Ac1 corresponding to the vehicle speed deviation and the own vehicle speed js by referring to, for example but not limited to, a preset map. At this point, in a case where the vehicle speed deviation has a positive value, a larger value may be set in the candidate target acceleration Ac1, within a range having an upper limit value corresponding to the own vehicle speed js, as the vehicle speed deviation is larger. In contrast, in a case where the vehicle speed deviation has a negative value, a smaller value may be set in the candidate target acceleration Ac1, within a range having a lower limit value corresponding to the own vehicle speed js, as the vehicle speed deviation is smaller. A value larger in the decelerating side may be set as the vehicle speed deviation is larger in the negative side.

Upon making a transition to the following travel control during the constant-speed travel control, the driving assist controller 5 may calculate, in addition to the candidate target acceleration Ac1 described above, a candidate target acceleration Ac2 for causing the inter-vehicle distance cd to converge to the target inter-vehicle distance Dt.

The driving assist controller 5 may have a map for setting the target inter-vehicle distance Dt preset and prestored therein, and the driving assist controller 5 may set the target inter-vehicle distance Dt corresponding to the own vehicle speed js with the use of the map for setting the target inter-vehicle distance Dt.

The driving assist controller 5 may, for example, calculate the candidate target acceleration Ac2 by calculating a distance deviation (e.g., "Dt−cd") of the inter-vehicle distance cd relative to the target inter-vehicle distance Dt and by referring to, for example but not limited to, a preset map with the calculated distance deviation and the above-described relative velocity ds serving as parameters.

The driving assist controller 5 may set the candidate target acceleration Ac1 as a target acceleration As during the constant-speed travel control. The driving assist controller 5 may set the smaller one of the candidate target acceleration Ac1 and the candidate target acceleration Ac2 as a target acceleration As during the following travel control.

On the basis of the target acceleration As calculated in this manner, the driving assist controller 5 may obtain a requested torque Ts and output the requested torque Ts to the engine controller 7, may obtain a brake fluid pressure and output the brake fluid pressure to the brake controller 9, and may obtain a transmission ratio and output the transmission ratio to the transmission controller 8. The engine controller 7, the brake controller 9, and the transmission controller 8 may operate in accordance with the requested torque Ts, the brake fluid pressure, and the transmission ratio, respectively, and thus the ACC may be achieved.

The sensors and operators 10 may inclusively represent various sensors and operators provided in the own vehicle. The sensors and operators 10 may include, as sensors, a vehicle speed sensor 10a, an engine speed sensor 10b, an accelerator position sensor 10c, a steering angle sensor 10d, a yaw rate sensor 10e, a G-sensor 10f, and a brake switch 10g. The vehicle speed sensor 10a may detect the speed of the own vehicle as the own vehicle speed js. The engine speed sensor 10b may detect the number of revolutions the engine makes. The accelerator position sensor 10c may detect the accelerator position from the amount by which the accelerator pedal is being stepped on. The steering angle sensor 10d may detect the steering angle. The yaw rate sensor 10e may detect the yaw rate. The G-sensor 10f may detect the acceleration. The brake switch 10g may be turned ON/OFF in accordance with engagement/disengagement of the brake pedal.

Although not illustrated, the sensors and operators 10 may further include other sensors. Examples of such other sensors may include an intake air amount sensor, a throttle lift sensor, a water temperature sensor, an outside temperature sensor, and a slope sensor. The intake air amount sensor may detect the amount of air taken into the engine. The throttle lift sensor may be disposed in an air passage and detect the lift of a throttle valve that adjusts the amount of intake air to be supplied to each cylinder of the engine. The water temperature sensor may detect the cooling water temperature that indicates the engine temperature. The outside temperature sensor may detect the temperature outside the own vehicle. The slope sensor may detect the slope of the own vehicle traveling route.

Examples of the operators may include an ignition switch, an operator for performing an operation pertaining to the ACC described above, a select lever, and a display changeover switch. The ignition switch may be for instructing that the engine be started or stopped. The select lever may be for selecting between an automatic transmission mode and a manual transmission mode of an automatic transmission or for instructing that the gear be shifted up or shifted down in the manual transmission mode. The display changeover switch may be for changing display information in a multifunction display (MFD) provided in the display 11 described later.

The display 11 may inclusively represent various gauges, such as a speedometer or a tachometer, provided in an instrument panel in front of the driver, the MFD, and other display devices for presenting information to the driver. The MFD may be able to display various pieces of information, such as the total travel distance of the own vehicle, the outside temperature, or the instantaneous fuel consumption, simultaneously or one by one.

The display controller 6 may control a display operation of the display 11 on the basis of, for example but not limited to, a detection signal from a predetermined sensor in the sensors and operators 10 and/or operation input information of an operator in the sensors and operators 10. For example, on the basis of an instruction from the driving assist controller 5, the display controller 6 may be able to display a predetermined message calling for the driver's attention in the display 11 as a part of the driving assist. This predetermined message may be displayed, for example, within a predetermined region of the MFD.

The engine controller 7 may control various actuators provided to serve as the engine-related actuator 12 on the basis of, for example but not limited to, a detection signal from a predetermined sensor in the sensors and operators 10 and/or operation input information of an operator in the sensors and operators 10. In the engine-related actuator 12, for example, various actuators pertaining to driving of the engine, such as a throttle actuator that actuates the throttle valve and an injector that performs fuel injection, may be provided.

For example, the engine controller 7 may control the start and the stop of the engine in accordance with an operation of the ignition switch described above. The engine controller 7 may also control, for example but not limited to, the fuel injection timing, the fuel injection pulse duration, and the throttle lift on the basis of a detection signal from a predetermined sensor, such as the engine speed sensor 10b or the accelerator position sensor 10c. In the ACC, the engine controller 7 may obtain, for example, from a map, a target throttle lift on the basis of the transmission ratio of the automatic transmission and the requested torque Ts calculated and output by the driving assist controller 5 on the basis of the target acceleration As. On the basis of the obtained throttle lift, the engine controller 7 may control the throttle actuator, i.e., may control the output of the engine.

The transmission controller 8 may control various actuators provided to serve as the transmission-related actuator 13 on the basis of, for example but not limited to, a detection signal from a predetermined sensor in the sensors and operators 10 and/or operation input information of an operator in the sensors and operators 10. In the transmission-related actuator 13, an actuator for gear shift control of the automatic transmission may be provided, for example.

For example, when the automatic transmission mode is being selected through the select lever described above, the transmission controller 8 may perform the gear shift control by outputting a gear shift signal to the aforementioned actuator in accordance with a predetermined gear shift pattern. Meanwhile, when the manual transmission mode is being set, the transmission controller 8 may perform the gear shift control by outputting a gear shift signal to the aforementioned actuator in accordance with a shifting-up/shifting-down instruction input through the select lever.

In a case where the automatic transmission is a continuously variable transmission (CVT), in the gear shift control performed when the automatic transmission mode is being set, control of continuously changing the transmission ratio may be performed.

The brake controller 9 may control various actuators provided to serve as the brake-related actuator 14 on the basis of, for example but not limited to, a detection signal from a predetermined sensor in the sensors and operators 10 and/or operation input information of an operator in the sensors and operators 10. In the brake-related actuator 14, for example, various actuators pertaining to the brake, such as a fluid pressure controlling actuator for controlling the output fluid pressure from the brake booster to the master cylinder or the fluid pressure within a brake fluid pipe, may be provided. For example, the brake controller 9 may control the fluid pressure controlling actuator described above on the basis of information providing an instruction on the fluid pressure output from the driving assist controller 5 and cause the own vehicle to brake. In addition, the brake controller 9 may implement so-called antilock brake system (ABS) control by calculating the slip ratio of the wheels from detection information of a predetermined sensor, such as an axle rotation speed sensor or the vehicle speed sensor 10a, and by increasing or decreasing the fluid pressure with the fluid pressure controlling actuator described above in accordance with the calculated slip ratio.

First Embodiment

A process according to the first embodiment that is implemented in the vehicle controlling apparatus 1 configured as described above will be described.

Figure 2:
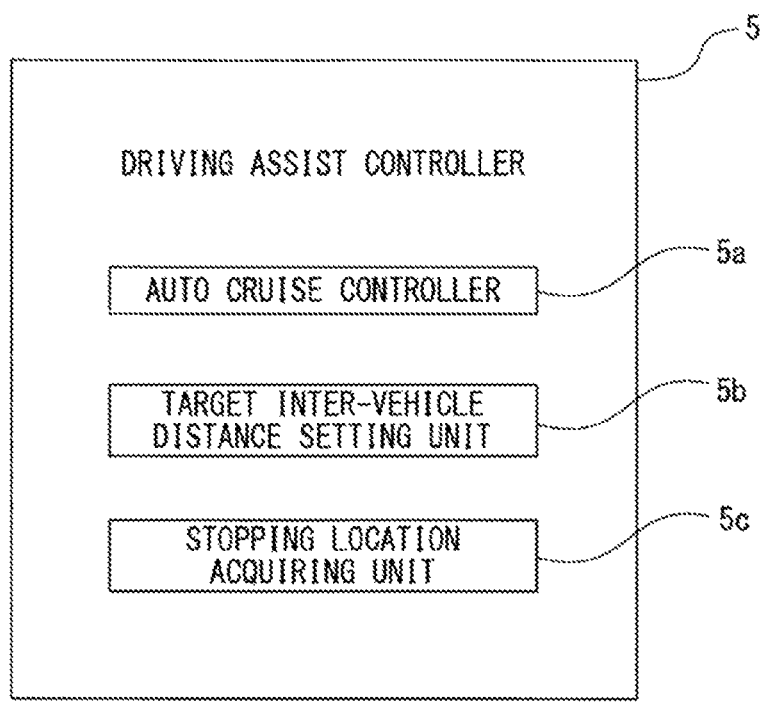
FIG. 2 is an illustration of an example of a functional configuration of a driving assist controller according to an embodiment.

FIG. 2 illustrates an example of a functional block diagram for performing the following control according to an embodiment. FIG. 2 illustrates, in blocks, functions for achieving, of the auto cruise control executed by the driving assist controller 5, a process according to the present embodiment.

As illustrated in FIG. 2, the driving assist controller 5 may include an auto cruise controller 5a, a target inter-vehicle distance setting unit 5b, and a stopping location acquiring unit 5c.

The auto cruise controller 5a may set the target acceleration As described above on the basis of, for example but not limited to, preceding vehicle information held in the memory 4, information on the own vehicle speed js detected by the vehicle speed sensor 10a, and the target inter-vehicle distance Dt. On the basis of the set target acceleration As, the auto cruise controller 5a may obtain the requested torque Ts, the brake fluid pressure, and the transmission ratio for achieving the following travel control or the constant-speed travel control and send out the obtained requested torque Ts, brake fluid pressure, and transmission ratio to the engine controller 7, the brake controller 9, and the transmission controller 8, respectively.

The target inter-vehicle distance setting unit 5b sets the target inter-vehicle distance Dt as one traveling condition in the auto cruise control. The auto cruise controller 5a may perform the following control with the use of the set target inter-vehicle distance Dt.

The stopping location acquiring unit 5c acquires position information of a temporary stopping location on the traveling route where the own vehicle travels. For example, the stopping location acquiring unit 5c may recognize information on, for example but not limited to, a stop line and/or a railroad crossing recognized by the imaging unit 2 and the image processor 3 and calculate or acquire the position information on that temporary stopping location. For the position information, the stopping location acquiring unit 5c may calculate or acquire the distance from the own vehicle to the temporary stopping location.

The stopping location acquiring unit 5c may acquire the position information on a temporary stopping location in the form of position information from an own vehicle position detecting system that uses, for example, a global positioning system (GPS) receiver and map data (neither is illustrated in FIG. 1). Regardless of the technique to be used, it may suffice that the stopping location acquiring unit 5c be able to obtain at least the distance from the own vehicle to a temporary stopping location.

In the present embodiment, the target inter-vehicle distance setting unit 5b performs a process of changing the target inter-vehicle distance Dt from a normal setting value in a case where the own vehicle is traveling following a preceding vehicle and where the stopping location acquiring unit 5c has acquired the position information on a temporary stopping location.

The normal setting value as used in this example may be a target inter-vehicle distance that is set in accordance with a vehicle speed, a system setting, a user specification, or any other condition. In other words, the normal setting value may refer to the value of the target inter-vehicle distance that is set on the basis of an inter-vehicle distance setting condition other than the setting corresponding to the distance from the own vehicle to a temporary stopping location according to the present embodiment. For example, the target inter-vehicle distance Dt may be set in the form of a duration, such as "1.5 seconds" or "2 seconds." For example, the target inter-vehicle distance Dt may be set as "an inter-vehicle distance that would allow the own vehicle to reach the position of the preceding vehicle in two seconds." In this case, the value of the target inter-vehicle distance Dt may differ depending on the own vehicle speed, but this inter-vehicle distance that the own vehicle would cover in two seconds may serve as the normal setting value of the target inter-vehicle distance.

It is needless to say that there may be other conditions for setting the target inter-vehicle distance Dt.

Therefore, it may suffice that the normal setting value be regarded as a setting value held up to a point when the setting is changed in accordance with the distance to a temporary stopping location, as described below in the present embodiment. Accordingly, the normal setting value may not necessarily take a certain fixed setting value.

In a case where the stopping location acquiring unit 5c has acquired the position information on a temporary stopping location, upon the distance from the own vehicle to the temporary stopping location reaching a predetermined distance, the target inter-vehicle distance setting unit 5b makes such a setting change that makes the target inter-vehicle distance Dt greater than the normal setting value. Furthermore, the target inter-vehicle distance setting unit 5b makes such a setting change that brings the target inter-vehicle distance Dt closer to the normal setting value in accordance with the distance from the own vehicle to the temporary stopping location while the own vehicle is coming to the temporary stopping location.

In other words, when the following control in which the own vehicle follows a preceding vehicle is performed in the auto cruise control, the setting of the target inter-vehicle distance may be changed in accordance with the distance-wise relationship of the own vehicle and a stopping location.

Figure 3A:
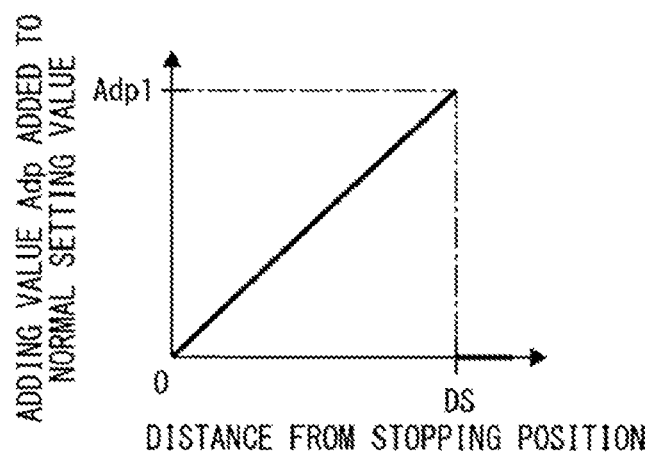
FIGS. 3A and 3B are illustrations for describing an example of setting a target inter-vehicle distance corresponding to a distance from a stopping position according to an embodiment.

FIG. 3A illustrates an example of a change in the target inter-vehicle distance Dt made after the distance from the own vehicle to a temporary stopping location has reached a predetermined distance DS.

The horizontal axis represents the distance from the own vehicle to the temporary stopping location, and the vertical axis represents the value (adding value Adp) of the inter-vehicle distance by which the normal setting value MN is to be increased. Therefore, FIG. 3A illustrates a change in the adding value Adp corresponding to the distance to the temporary stopping location. Thus, the value of "0" on the vertical axis may correspond to the value of the target inter-vehicle distance Dt serving as the normal setting value MN.

In FIG. 3A, the target inter-vehicle distance Dt may be set to the normal setting value MN until the distance to the temporary stopping location reaches the predetermined distance DS.

When the own vehicle has reached a position where the distance to the temporary stopping location becomes the predetermined distance DS while the own vehicle is approaching the temporary stopping location, the target inter-vehicle distance Dt may be changed to a value obtained by adding an adding value Adp1 to the normal setting value MN. In other words, the value of the target inter-vehicle distance Dt may be increased. Thus, the following control may be performed, aiming for a greater inter-vehicle distance.

Thereafter, as the own vehicle approaches the temporary stopping location, the adding value Adp to be added to the normal setting value MN may be reduced, as illustrated in FIG. 3A. In other words, the target inter-vehicle distance Dt may be gradually reduced. When the own vehicle reaches the temporary stopping location, the adding value Adp may be set to zero. In other words, the target inter-vehicle distance Dt may be restored to the original normal setting value MN.

Figure 3B:
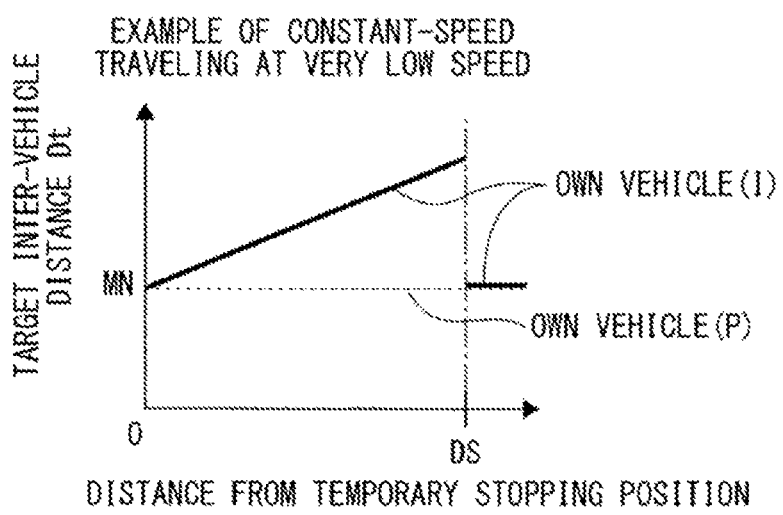

FIG. 3B illustrates an example of constant-speed traveling in a very low speed situation, such as traveling in congested traffic.

The horizontal axis represents the distance from the own vehicle to the temporary stopping location, and the vertical axis represents the target inter-vehicle distance Dt.

"OWN VEHICLE (I)" indicated by solid lines represents a change in the target inter-vehicle distance Dt for the own vehicle held in a case where the process according to the present embodiment is performed, and "OWN VEHICLE (P)" indicated by a dashed line represents a change in the target inter-vehicle distance Dt for the own vehicle held in a typical process in which the process of the present embodiment is not performed.

Typically, control adapted to the distance from the own vehicle to a temporary stopping location is not particularly performed, and thus the target inter-vehicle distance Dt for the own vehicle (P) remains at the normal setting value MN.

In contrast, the target inter-vehicle distance Dt for the own vehicle (I) obtained through the control according to the present embodiment may increase upon the distance to a temporary stopping location reaching the predetermined distance DS, and this target inter-vehicle distance may gradually decrease thereafter until the own vehicle (I) reaches the temporary stopping location. The target inter-vehicle distance Dt may be restored to the normal setting value MN when the own vehicle (I) stops at the temporary stopping location.

For simplifying the illustration, the solid line and the dashed line are so illustrated as not to overlap each other in a portion where the distance is greater than the predetermined distance DS. The target inter-vehicle distance Dt for the own vehicle (I) and the target inter-vehicle distance Dt for the own vehicle (P), however, may both be the normal setting value MN.

Figure 4:
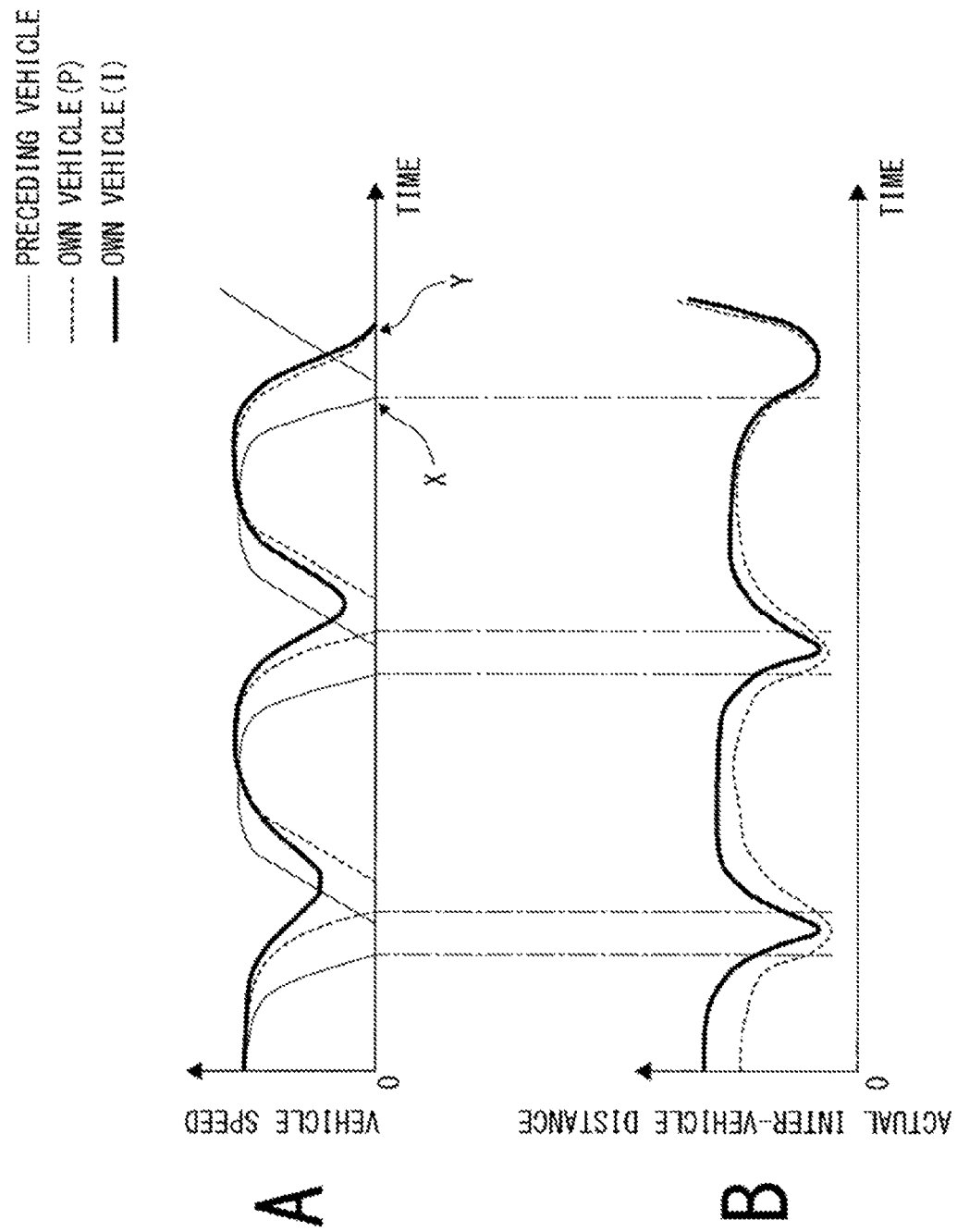
FIG. 4 is an illustration for describing an example of a change in a vehicle speed and a change in an inter-vehicle distance arising in a case where a target inter-vehicle distance setting according to an embodiment is used.

Controlling the setting of the target inter-vehicle distance Dt in this manner may make it possible to obtain the traveling condition such as the one illustrated in FIG. 4. In A of FIG. 4, the horizontal axis represents the time, and the vertical axis represents the vehicle speed. In B of FIG. 4, the horizontal axis represents the time, and the vertical axis represents the actual inter-vehicle distance, which is not the target inter-vehicle distance Dt. A thin solid line represents the vehicle speed of a preceding vehicle, dashed lines represent the vehicle speed of the own vehicle (P) and the inter-vehicle distance from the own vehicle (P) to the preceding vehicle of a typical example, and thick solid lines represent the vehicle speed of the own vehicle (I) and the inter-vehicle distance between the own vehicle (I) and the preceding vehicle according to an example of the embodiment.

The period in which the vehicle speed is "0" may be a period in which the vehicle is at halt. The stop that the preceding vehicle makes at a portion indicated by an arrow X is a stop made at a temporary stopping location.

The timing at which the time is "0" may come after the distance to the temporary stopping location has reached the predetermined distance DS.

In this case, the preceding vehicle may repeat deceleration, stopping, and acceleration, and the own vehicle (P) of the typical example repeats deceleration, stopping, and acceleration following the preceding vehicle.

In contrast, the own vehicle (I) according to the present embodiment may decelerate and accelerate gently and refrain from making an unnecessary stop following the preceding vehicle.

Although the own vehicle (I) makes a stop at a portion indicated by an arrow Y, this may be a stop made at a temporary stopping location and may be a necessary stop.

Referring to the actual inter-vehicle distance, in the case of the embodiment, as a large target inter-vehicle distance Dt is set first, the inter-vehicle distance may be greater than the inter-vehicle distance held in the case of the typical example. Thereafter, the target inter-vehicle distance Dt may be reduced gradually, and thus the actual inter-vehicle distance may substantially converge to the actual inter-vehicle distance held in the case of the typical example.

In the present embodiment, through the control described above, the fuel efficiency and the comfort of the ride may be improved as unnecessary acceleration and deceleration are suppressed without an increase in the time it takes to pass through a railroad crossing and/or a temporary stopping location while the traffic is congested at the railroad crossing and/or an intersection with the temporary stop.

In addition, the target inter-vehicle distance may be brought closer to the normal setting value as the own vehicle approaches a railroad crossing and/or a temporary stop. Thus, the change in the acceleration and deceleration may be gradually increased to increase the behavior of the own vehicle, and this may make it possible to inform the driver through a bodily sensation that the own vehicle is approaching a temporary stop (a place where the driver may need to be cautious).

In addition, it is possible to expect an effect of reducing the length of congested traffic.

Figure 5:
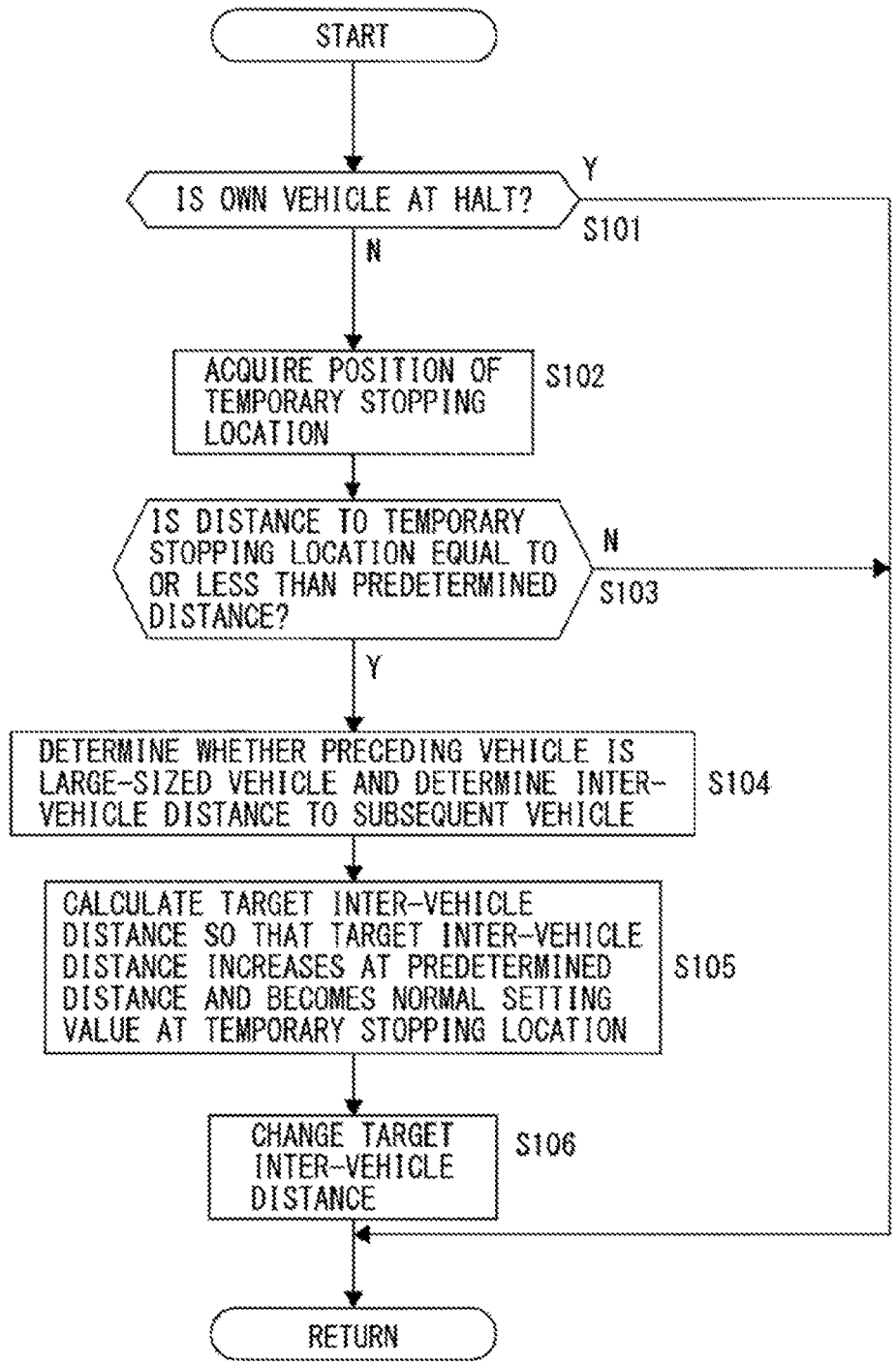
FIG. 5 is a flowchart of an example of a target inter-vehicle distance setting process according to an embodiment.

FIG. 5 illustrates an example of a process for changing the setting of the target inter-vehicle distance Dt as described above. FIG. 5 illustrates an example of a process of the driving assist controller 5 provided with the functional configuration illustrated in FIG. 2.

The driving assist controller 5 may execute the process illustrated in FIG. 5 iteratively during the ACC control.

In step S101, the driving assist controller 5 may determine whether the own vehicle is currently at halt. If the own vehicle is currently at halt (YES in step S101), the driving assist controller 5 may temporarily end the process illustrated in FIG. 5 and may restart the process from step S101.

In a case where the driving assist controller 5 has determined in step S101 that the own vehicle is not at halt (NO in step S101), the driving assist controller 5 may proceed from step S101 to step S102. In step S102, the driving assist controller 5 may acquire position information on a temporary stopping location.

In step S103, the driving assist controller 5 may determine whether the current distance from the own vehicle to the temporary stopping location is equal to or less than the predetermined distance DS.

If the current distance from the own vehicle to the temporary stopping location is greater than the predetermined distance DS (NO in step S103), the driving assist controller 5 may refrain from changing the target inter-vehicle distance Dt from the normal setting value.

If the current distance from the own vehicle to the temporary stopping location is equal to or less than the predetermined distance DS (YES in step S103), the driving assist controller 5 may proceed to step S104. In step S104, the driving assist controller 5 may check information on a preceding vehicle and on a subsequent vehicle.

In this case, with regard to the preceding vehicle, the driving assist controller 5 may determine whether the preceding vehicle is a large-sized vehicle. Although a large-sized vehicle as used in this example may be a vehicle having a large vehicle body, such as a truck or a bus, it may be desirable that whether a given vehicle is a large-sized vehicle be determined not necessarily from, for example, the type or the displacement of the vehicle but from the height of the vehicle. To rephrase, it may be determined whether the preceding vehicle is a vehicle that has an elevated driver's seat and in which the driver is able to see the front from an elevated position.

If it is possible to accurately determine the vehicle type of the preceding vehicle through, for example but not limited to, image recognition that uses an image picked up by the imaging unit 2 or through vehicle-to-vehicle communication, the driving assist controller 5 may make a determination on the basis of that determination result. In a simpler way, the driving assist controller 5 may compare the height of the vehicle calculated from an image against a predetermined threshold value, and the driving assist controller 5 may determine that the preceding vehicle is a large-sized vehicle if the calculated height is greater than the threshold value or that the preceding vehicle is not a large-sized vehicle if the calculated height is equal to or less than the threshold value. If the calculated height is equal to or less than the threshold value, the driving assist controller 5 may determine that the preceding vehicle is a vehicle having a relatively small vehicle body, such as a passenger car or a motorcycle. A boundary for making a determination as to whether a preceding vehicle is a large-sized vehicle or is not a large-sized vehicle may be set on the basis of, for example but not limited to, the height of the vehicle.

With regard to the subsequent vehicle, the driving assist controller 5 may determine the inter-vehicle distance from the own vehicle to the subsequent vehicle. For example, the inter-vehicle distance may be measured with the use of an image from a camera that picks up an image of a space behind the own vehicle and/or with the use of a sensor, such as a range finding sensor.

The driving assist controller 5 may compare the calculated inter-vehicle distance against a predetermined threshold value and determine whether the inter-vehicle distance is short. In other words, the driving assist controller 5 may determine whether the subsequent vehicle is traveling behind the own vehicle with a small inter-vehicle distance. This determination result may be reflected on the setting of the target inter-vehicle distance Dt.

This process in step S104 may not be performed. In step S104, the driving assist controller 5 may determine only whether the preceding vehicle is a large-sized vehicle.

In step S104, the driving assist controller 5 may determine only whether the inter-vehicle distance to the subsequent vehicle is short.

In step S105, the driving assist controller 5 may calculate the target inter-vehicle distance Dt. In other words, the driving assist controller 5 may calculate the current target inter-vehicle distance Dt that allows the target inter-vehicle distance Dt to take a value corresponding to the distance to the temporary stopping location. In one example of calculating the target inter-vehicle distance Dt, the process of obtaining the adding value Adp to be added to the normal setting value MN may be conceivable, as described with reference to FIG. 3A.

In other words, the adding value Adp may be obtained in accordance with the distance to the temporary stopping location held at that moment. For example, a data table holding the adding value Adp corresponding to the distance may be prepared, and the adding value Adp corresponding to the current distance may be read out from the data table. Alternatively, a coefficient calculation may be performed on the distance to obtain the adding value Adp. In any case, the adding value Adp that may yield the relationship indicated by the solid lines illustrated in FIG. 3A may be obtained. In other words, the adding value Adp may be a value corresponding to the distance to the temporary stopping location held at that moment, and this value may be at a maximum when the distance to the temporary stopping location is the predetermined distance DS, and this value may be "0" when the distance to the temporary stopping location is zero.

Thereafter, in step S106, the driving assist controller 5 may change the target inter-vehicle distance Dt with the use of the obtained adding value Adp. In other words, the driving assist controller 5 may add the adding value Adp to the normal setting value MN to increase the target inter-vehicle distance Dt.

In step S105 described above, the driving assist controller 5 may change the target inter-vehicle distance Dt by obtaining the adding value Adp corresponding to the distance and by adding the obtained adding value Adp to the normal setting value MN. It may be conceivable that such an example is adopted without performing step S104, for example.

Meanwhile, in step S105, it may also be possible to set the target inter-vehicle distance Dt with the determination in step S104 taken into consideration. For example, the following example may be conceivable.

In a case where the driving assist controller 5 has determined that the preceding vehicle is not a large-sized vehicle, the adding value Adp obtained in accordance with the distance may be added, without being modified, to the normal setting value MN (target inter-vehicle distance Dt=Adp+MN).

Meanwhile, in a case where the driving assist controller 5 has determined that the preceding vehicle is a large-sized vehicle, the adding value Adp obtained in accordance with the distance may be adjusted to a smaller value, and the adjusted adding value AdpC may be added to the normal setting value MN (target inter-vehicle distance Dt=AdpC+MN).

In this example, it may be conceivable that the adjusted adding value AdpC is obtained, for example, by selecting a subtracting value N corresponding to the distance to the temporary stopping location and by subtracting the selected subtracting value N from the adding value Adp (AdpC=Adp−N).

Alternatively, the adjusted adding value AdpC may be obtained, for example, by multiplying the adding value Adp by an adjustment coefficient Kc for adjusting the adding value Adp to a smaller value (AdpC=Adp×Kc).

The above approach may be applied similarly to the determination on the inter-vehicle distance from the own vehicle to the subsequent vehicle.

In a case where the driving assist controller 5 has determined that the inter-vehicle distance to the subsequent vehicle is not short, the adding value Adp obtained in accordance with the distance may be added, without being modified, to the normal setting value MN (target inter-vehicle distance Dt=Adp+MN).

Meanwhile, in a case where the driving assist controller 5 has determined that the inter-vehicle distance to the subsequent vehicle is short, the adding value Adp obtained in accordance with the distance may be adjusted to a smaller value, and the adjusted adding value AdpC may be added to the normal setting value MN (target inter-vehicle distance Dt=AdpC+MN).

A technique similar the above may be conceivable for calculating the adjusted adding value AdpC.

Accordingly, conceivably, through an OR condition for a case where the preceding vehicle is determined to be a large-sized vehicle or the inter-vehicle distance to the subsequent vehicle is determined to be short, the target inter-vehicle distance Dt may be set by adding AdpC to MN (Dt=AdpC+MN), or in a case where the preceding vehicle is determined not to be a large-sized vehicle and where the inter-vehicle distance to the subsequent vehicle is determined not to be short, the target inter-vehicle distance Dt may be set by adding Adp to MN (Dt=Adp+MN).

In step S105 described above, the adding value Adp corresponding to the distance to the temporary stopping location may be obtained, and the obtained adding value Adp may be added to the normal setting value MN to obtain the target inter-vehicle distance Dt. Various techniques may be employed to calculate the target inter-vehicle distance Dt in step S105.

For example, a coefficient greater than 1 may be set in accordance with the distance to the temporary stopping location, and the target inter-vehicle distance Dt may be increased by multiplying the normal setting value MN by the set coefficient.

It is needless to say that, instead of performing an addition or a multiplication, the target inter-vehicle distance Dt may be obtained with the use of a lookup table (LUT) for reading out the target inter-vehicle distance Dt corresponding to the distance.

Furthermore, in the above cases, with regard the adjustment made in accordance with the determination as to whether the preceding vehicle is a large-sized vehicle or the determination on the inter-vehicle distance to the subsequent vehicle, the target inter-vehicle distance Dt may be adjusted not through the adjustment on the adding value Adp but, for example but not limited to, through an adjustment on the value of the coefficient for the normal setting value MN or with the use of an LUT corresponding to a case where the preceding vehicle is determined to be a large-sized vehicle or the inter-vehicle distance to the subsequent vehicle is determined to be short.

In step S106, the driving assist controller 5 may change the setting of the target inter-vehicle distance Dt. In other words, the driving assist controller 5 may allow the ACC control to be performed with the target inter-vehicle distance Dt obtained in step S105. This may allow the following control to be performed with an increased target inter-vehicle distance Dt.

As the foregoing processes are repeated, after the distance from the own vehicle to the temporary stopping location has reached or fallen below the predetermined distance DS, the processes in steps S104 to S106 may be repeated.

Therefore, the target inter-vehicle distance Dt may be set longer than the normal setting value MN by the adding value Adp corresponding to the distance held when the distance to the temporary stopping location has first reached or fallen below the predetermined distance DS.

Thereafter, as the distance to the temporary stopping location gradually decreases, the adding value Adp set in step S105 may decrease, and the target inter-vehicle distance Dt may become smaller than the target inter-vehicle distance held when the distance to the temporary stopping location is the predetermined distance DS.

When the own vehicle has reached the temporary stopping location, the target inter-vehicle distance Dt may come to the normal setting value MN.

As the own vehicle reaches the temporary stopping location, the position information on the temporary stopping location acquired in step S102 may become invalid. Thereafter, the negative result may be obtained in step S103 until the distance to the next temporary stopping location becomes equal to or less than the predetermined distance DS, and thus the target inter-vehicle distance Dt may remain at the normal setting value MN.

Through the processes illustrated in FIG. 5 described above, the traveling condition as described with reference to FIGS. 3A to 4 may be obtained.

Second Embodiment

A second embodiment will be described with reference to FIGS. 6 to 8.

The second embodiment may be an example in which the own vehicle speed is also reflected when the target inter-vehicle distance Dt is changed in accordance with the distance to a temporary stopping location. Furthermore, a situation, such as a railroad crossing, may also be reflected.

Figure 6:
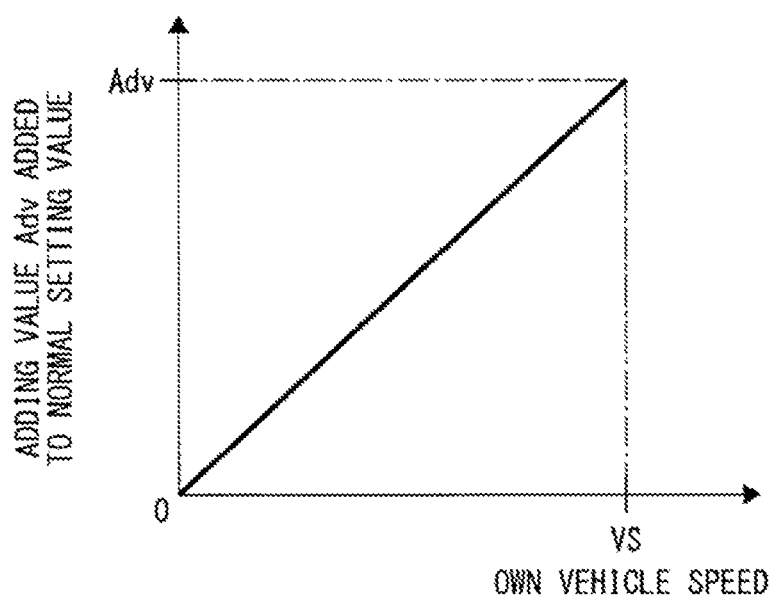
FIG. 6 is an illustration for describing an example of setting a target inter-vehicle distance corresponding to an own vehicle speed according to an embodiment.

In FIG. 6, the vertical axis represents an adding value Adv to be added to the normal setting value MN, and the horizontal axis represents the own vehicle speed VS, and FIG. 6 illustrates a relationship between the adding value Adv and the own vehicle speed VS. In other words, in this example, as the own vehicle speed VS is higher, the inter-vehicle distance may be made longer, and the adding value Adv may be made zero when the own vehicle has come to a halt.

As illustrated in FIG. 3A, in the first embodiment described above, the adding value Adp corresponding to the distance to the temporary stopping location is illustrated. In the second embodiment, the setting of the target inter-vehicle distance Dt may be changed in accordance with both the adding value Adp and the adding value Adv.

Accordingly, for example, an adding value (referred to as an adding value Ad) held when the setting of the target inter-vehicle distance Dt is actually changed may be an adding value obtained with the use of the adding value Adp corresponding to the distance and the adding value Adv corresponding to the own vehicle speed. For example, it may be conceivable that the adding value Ad to be added to the normal setting value MN is obtained through, for example but not limited to, an addition, a multiplication, or a weighted addition of these two adding values Adp and Adv.

In the above description, the label "Adv" indicated on the vertical axis in FIG. 6 may indicate the "adding value Adv." Alternatively, this vertical axis may be regarded as a "multiplication coefficient Adv" for multiplying the adding value Adp corresponding to the distance. In other words, the multiplication coefficient may be selected in accordance with the own vehicle speed, and the adding value Adp may be multiplied by this multiplication coefficient Adv to obtain the adding value Ad. In that case, however, the value of the multiplication coefficient Adv held when the distance has become zero may be "1."

In any case, after the distance to the temporary stopping location has reached or fallen below the predetermined distance, the setting of the inter-vehicle distance may be changed in accordance with the distance and the speed.

Figure 7A:
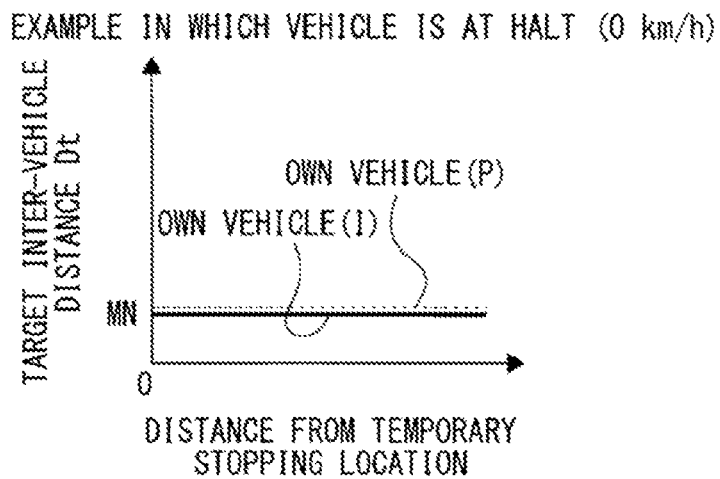
FIGS. 7A to 7C are illustrations for describing an example of a change in a target inter-vehicle distance held at each vehicle speed according to an embodiment.
Figure 7B:
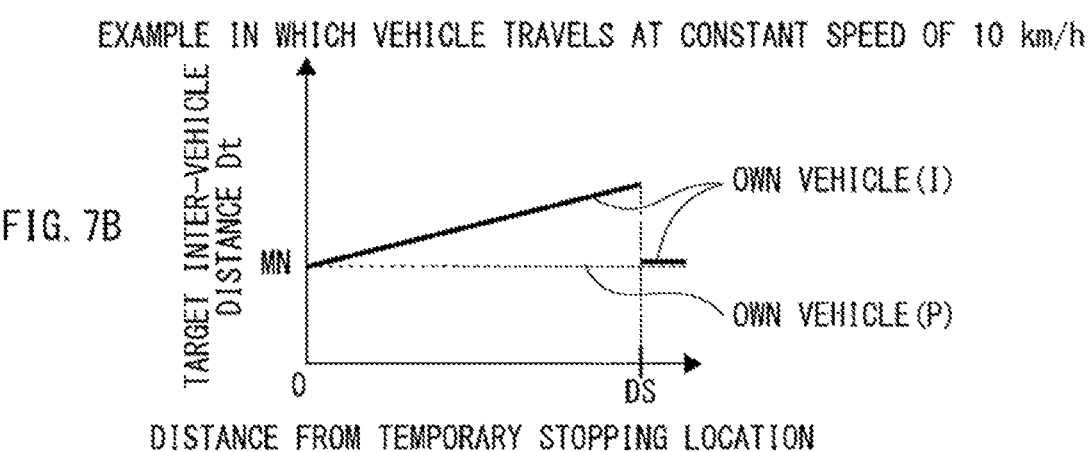
Figure 7C:
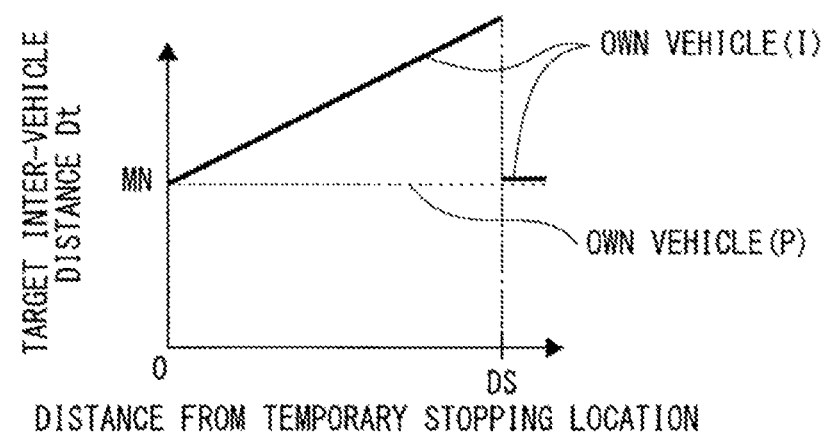

FIGS. 7A to 7C illustrate examples of the setting value of the target inter-vehicle distance Dt in respective speed conditions.

FIG. 7A illustrates an example in which the own vehicle is at halt, FIG. 7B illustrates an example in which the own vehicle is traveling at 10 km/h, and FIG. 7C illustrates an example in which the own vehicle is traveling at 20 km/h. In FIG. 7A, the target inter-vehicle distances for the own vehicle (P) and for the own vehicle (I) may both be constant at the normal setting value MN but are so indicated as not to overlap each other for the convenience of illustration. In FIGS. 7B and 7C as well, the lines are so illustrated as not to overlap each other in a portion where the distance is greater than the predetermined distance DS, but the target inter-vehicle distance Dt for the own vehicle (I) and the target inter-vehicle distance Dt for the own vehicle (P) may both be the normal setting value MN.

Typically, control adapted to the distance from the own vehicle to a temporary stopping location and the speed of the own vehicle is not particularly performed. Thus, the target inter-vehicle distance Dt of the own vehicle (P) does not change in accordance with the distance to the temporary stopping location in any of the cases.

In contrast, the target inter-vehicle distance Dt for the own vehicle (I) obtained through the control according to the present embodiment may increase upon the distance to the temporary stopping location reaching the predetermined distance DS and may gradually decrease thereafter until the own vehicle (I) reaches the temporary stopping location. The target inter-vehicle distance Dt may be restored to the normal setting value MN when the own vehicle (I) stops at the temporary stopping location.

The normal setting value MN differs in each of FIGS. 7A to 7C because the normal setting value MN may be set in the form of time as described above, and the normal setting value MN may include a speed element in that sense.

As seen from a comparison between FIGS. 7B and 7C, the distance by which the inter-vehicle distance is increased upon the distance to the temporary stopping location reaching the predetermined distance DS or the rate at which the target inter-vehicle distance Dt is decreased (i.e., the slope of the straight line) may differ. This may serve as an example held in a case where a distance element is added to the setting of the target inter-vehicle distance Dt after the distance to the temporary stopping location has reached or fallen below the predetermined distance DS.

If the own vehicle is at halt, the target inter-vehicle distance Dt may be at the normal setting value MN regardless of the distance to the temporary stopping location.

Through such control, as the own vehicle speed is lower, the target inter-vehicle distance Dt may further approach the normal setting value MN as compared to a case where the own vehicle speed is higher.

In a case where the own vehicle speed is low, too large an inter-vehicle distance may result in unnatural traveling. In addition, in a case where the own vehicle comes to a halt following a preceding vehicle midway even though the own vehicle has been following the preceding vehicle with a large inter-vehicle distance, it may be more natural if the inter-vehicle distance held when the own vehicle makes a stop is not large.

The second embodiment that takes these points into consideration may allow for smooth acceleration and deceleration until the own vehicle reaches the temporary stopping location, as in the first embodiment, and may also allow for natural traveling in relation to the preceding vehicle.

Figure 8:
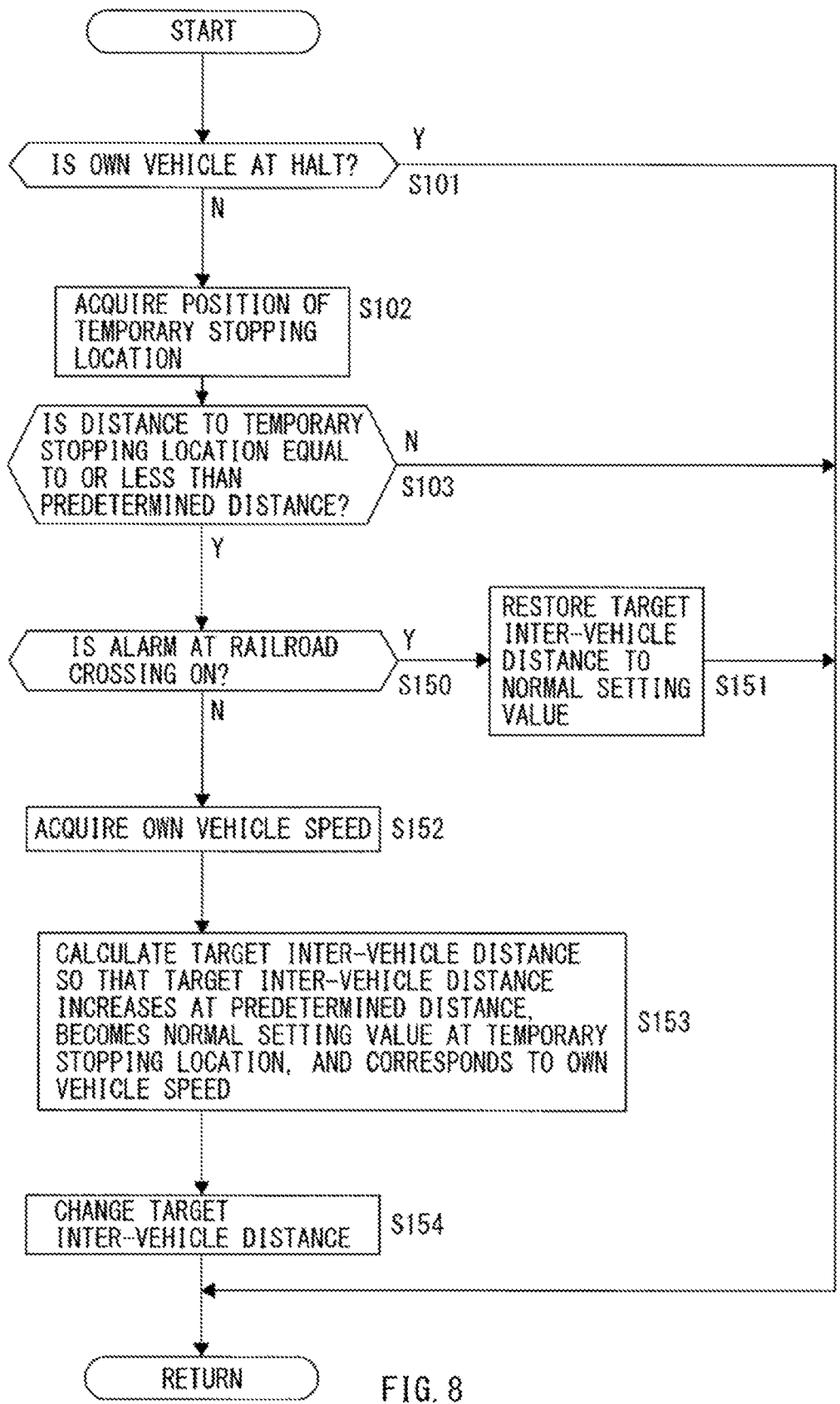
FIG. 8 is a flowchart of an example of a target inter-vehicle distance setting process according to an embodiment.

FIG. 8 illustrates an example of a process of the driving assist controller 5 according to the second embodiment. The driving assist controller 5 may execute the process illustrated in FIG. 8 iteratively during the ACC control. Steps S101, S102, and S103 may be similar to those of FIG. 5, and thus duplicate descriptions thereof will be omitted.

In a case where the distance to the temporary stopping location is equal to or less than the predetermined distance DS (YES in step S103), the process of the driving assist controller 5 may proceed from step S103 to step S150.

In step S150, the driving assist controller 5 may determine whether an alarm at a railroad crossing that is ahead of the own vehicle is on. In other words, the driving assist controller 5 may determine whether the temporary stopping location that is to be handled in this control is a railroad crossing and whether the alarm at that railroad crossing is on.

After the alarm at the railroad crossing has gone on, every vehicle may stop for a certain duration until a train passes through. In that case, the own vehicle may also stop. Therefore, when the alarm at the railroad crossing is on (YES in step S150), the driving assist controller 5 may proceed to step S151. In step S151, the driving assist controller 5 may restore the target inter-vehicle distance Dt to the normal setting value MN. Alternatively, even when the distance to the temporary stopping location has reached the predetermined distance DS, the driving assist controller 5 may refrain from changing the setting to increase the target inter-vehicle distance Dt.

In other words, even if the target inter-vehicle distance Dt has been changed in step S154 described later, the driving assist controller 5 may perform a process of restoring the target inter-vehicle distance Dt to the normal setting value MN if the alarm at the railroad crossing has gone on.

Thereafter, the driving assist controller 5 may finish a first iteration of the process illustrated in FIG. 8 and restart the process from step S101.

When the distance from the own vehicle to the temporary stopping location has reached or fallen below the predetermined distance DS (YES in step S103) and when the alarm at the railroad crossing is off (NO in step S150), the process illustrated in FIG. 8 may proceed to step S152.

In step S152, the driving assist controller 5 may acquire the own vehicle speed. For example, the driving assist controller 5 may acquire the detection value of the vehicle speed sensor 10a.

In step S153, the driving assist controller 5 may calculate the target inter-vehicle distance Dt. In this example, the driving assist controller 5 may calculate the current target inter-vehicle distance Dt so that the target inter-vehicle distance Dt takes a value that corresponds to the distance to the temporary stopping location and that corresponds to the own vehicle speed.

For example, as described with reference to FIGS. 6 and 3A, a process of obtaining the adding value Ad to be added to the normal setting value MN may be conceivable. For example, a data table for reading out each of the adding value Adp corresponding to the distance described above and the adding value Adv corresponding to the own vehicle speed may be prepared, and the adding value Adp and the adding value (or coefficient) Adv corresponding to the current distance and the own vehicle speed may be read out from the data table. With the use of the adding value Adp and the adding value (or coefficient) Adv, the adding value Ad may be obtained.

For example, the adding value Ad may be obtained from an expression Ad=Adp+Adv. Alternatively, in a case where "Adv" is a multiplication coefficient, the adding value Ad may be obtained from an expression Ad=Adp×Adv.

The adding value Adp may be obtained in a manner described in the first embodiment. This may apply similarly to the adding value (or multiplication coefficient) Adv.

The adding value Ad calculated as described above may be a value that corresponds to the distance to the temporary stopping location and the own vehicle speed held at that moment. The adding value Ad may be at a maximum when the distance to the temporary stopping location is the predetermined distance DS and may be "0" when the distance to the temporary stopping location is zero or when the own vehicle is at halt. This adding value Ad may be added to the normal setting value MN, and thus the target inter-vehicle distance Dt may be obtained.

Thereafter, in step S154, the driving assist controller 5 may change the target inter-vehicle distance Dt with the use of the obtained adding value Ad. In other words, the driving assist controller 5 may add the adding value Ad to the normal setting value MN to increase the target inter-vehicle distance Dt.

In place of the adding value Ad described above, for example, a coefficient greater than 1 may be set in accordance with the distance to the temporary stopping location and the own vehicle speed, and the driving assist controller 5 may increase the target inter-vehicle distance Dt by multiplying the normal setting value MN by this coefficient.

It is needless to say that, instead of performing an addition or a multiplication, the driving assist controller 5 may obtain the target inter-vehicle distance Dt with the use of an LUT for reading out the target inter-vehicle distance Dt corresponding to the distance and the own vehicle speed.

As the foregoing processes illustrated in FIG. 8 are repeated, after the distance from the own vehicle to the temporary stopping location has reached or fallen below the predetermined distance DS, the processes in steps S150 to S154 may be repeated. Thus, the target inter-vehicle distance Dt may be made longer than the normal setting value MN by the adding value Ad corresponding to the distance and the own vehicle speed held when the distance to the temporary stopping location has first reached or fallen below the predetermined distance DS.

Thereafter, as the distance to the temporary stopping location gradually decreases, the adding value Ad set in step S153 may decrease, and the target inter-vehicle distance Dt may become smaller than the target inter-vehicle distance Dt held when the distance to the temporary stopping location is the predetermined distance DS. When the own vehicle has reached the temporary stopping location, the target inter-vehicle distance Dt may become the normal setting value MN.

It may be naturally contemplated that the process performed in a case where the preceding vehicle is a large-sized vehicle and the process performed in a case where the inter-vehicle distance to the subsequent vehicle is short as described with reference to FIG. 5 be combined with the processes illustrated in FIG. 8.

Conclusion and Modification Examples

The following example effects may be obtained according to the embodiments described above.

The driving assist controller 5 in the vehicle controlling apparatus 1 according to the first and second embodiments may include the auto cruise controller 5a, the target inter-vehicle distance setting unit 5b, and the stopping location acquiring unit 5c. The auto cruise controller 5a may perform the auto cruise control of controlling the speed of the own vehicle to satisfy the set traveling condition. The target inter-vehicle distance setting unit 5b sets the target inter-vehicle distance Dt as one of traveling conditions in the auto cruise control. The stopping location acquiring unit 5c acquires the position information of a temporary stopping location on the traveling route on which the own vehicle travels.

On a condition that the own vehicle travels to follow a preceding vehicle and that the stopping location acquiring unit 5c has acquired the position information of a temporary stopping location, the target inter-vehicle distance setting unit 5b makes a setting change so that the target inter-vehicle distance Dt becomes longer than the normal setting value MN, when the distance from the own vehicle to the temporary stopping location reaches the predetermined distance DS. Furthermore, the target inter-vehicle distance setting unit 5b makes a setting change to bring the target inter-vehicle distance Dt closer to the normal setting value MN in accordance with the distance from the own vehicle to the temporary stopping location until the own vehicle reaches the temporary stopping location (S105 and S106 of FIG. 5 or S153 and S154 of FIG. 8).

In other words, when the following control in which the own vehicle follows the preceding vehicle is performed in the auto cruise control, the setting of the target inter-vehicle distance may be changed in accordance with a distance-wise relationship of the own vehicle and the stopping location.

Controlling the setting of the target inter-vehicle distance Dt in this manner may make it possible to ease the own vehicle's response in following the preceding vehicle in a situation in which the preceding vehicle repeatedly accelerates, decelerates, or stops and thus make it possible to keep the own vehicle from strictly following the acceleration and deceleration of the preceding vehicle while the own vehicle is traveling.

Therefore, for example, in a case where there is only one preceding vehicle traveling in front of the own vehicle, it is possible to reduce the driving force for maintaining the inter-vehicle distance when the own vehicle is approaching a temporary stopping location. This may work advantageously for the fuel efficiency and the electric mileage, making it possible to make the ride more comfortable.

In a case where a number of preceding vehicles are traveling in a line, the preceding vehicles may repeatedly make a stop and go, and this may lead to frequent acceleration and deceleration accordingly. Securing a large inter-vehicle distance may make it possible to reduce the acceleration in the acceleration and deceleration, and thus it is possible to improve the fuel efficiency and the electric mileage and to make the ride more comfortable.

Since the target inter-vehicle distance Dt approaches the normal setting value MN when the own vehicle approaches a temporary stopping location, the acceleration and deceleration may become the normal acceleration and deceleration. As a result, it is possible to make the driver recognize that the own vehicle is approaching the temporary stopping location.

In any case, the acceleration and deceleration may be suppressed, and thus an influence on a subsequent vehicle may be reduced, and an effect of reducing the length of congested traffic may be expected.

The setting of the target inter-vehicle distance Dt may be extended in a case where a railroad crossing (alarm), a stop sign, or a stop signal (red flashing light) is recognized and the distance to the railroad crossing (alarm), the stop sign, or the stop signal (red flashing light) has reached or fallen below a predetermined distance. This makes it possible to accurately increase the target inter-vehicle distance Dt in a case where increasing the target inter-vehicle distance Dt provides an advantage.

In the second embodiment, the target inter-vehicle distance setting unit 5b may set the target inter-vehicle distance Dt longer than the normal setting value MN except when the own vehicle is at halt and may change the setting of the target inter-vehicle distance Dt after the distance to the temporary stopping location has reached the predetermined distance DS in accordance with the distance from the own vehicle to the temporary stopping location and the own vehicle speed (see FIG. 8). In other words, the range and the ratio in which the setting of the target inter-vehicle distance Dt is allowed to vary may correspond to the own vehicle speed.

In a specific but non-limiting example, after the target inter-vehicle distance Dt has been increased, for example, the increased target inter-vehicle distance Dt may be brought closer to the normal setting value MN as the own vehicle approaches a stopping location, such as a railroad crossing (alarm) or a stop line. In that case, with the vehicle speed added as a condition, as the own vehicle speed is lower, the target inter-vehicle distance Dt may be brought even closer to the normal setting value MN, as compared to a case where the own vehicle speed is higher. In other words, as illustrated in FIGS. 7B and 7C, the slope of the line indicating the change in the setting value of the target inter-vehicle distance Dt may differ depending on the own vehicle speed.

As the own vehicle speed is also reflected on the setting of the target inter-vehicle distance Dt in this manner, even in a case where the own vehicle has come to a halt following the preceding vehicle midway (before reaching the stopping location) while the own vehicle is following the preceding vehicle with a large inter-vehicle distance, the own vehicle may be kept from stopping with an unnatural inter-vehicle distance provided between the own vehicle and the preceding vehicle. In other words, the inter-vehicle distance held when the own vehicle makes a stop may be reduced, resulting in a natural state. It may be natural if not too large an inter-vehicle distance is provided when the own vehicle makes a stop, and the above-described control may be desirable in a practical manner.

In the example described in the first embodiment, on a condition that the setting change of the target inter-vehicle distance Dt is made after the distance to a temporary stopping location has reached the predetermined distance DS, and that the preceding vehicle is determined to be a large-sized vehicle, the target inter-vehicle distance Dt in a case where the preceding vehicle is determined to be a large-sized vehicle may be set shorter than the target inter-vehicle distance Dt in a case where the preceding vehicle is determined not to be a large-sized vehicle.

A large-sized vehicle may have a large vehicle height, and the driver of the large-sized vehicle may easily see further ahead in congested traffic. Thus, it may be often the case that the driver is so driving as to make as little stop as possible (with the acceleration and deceleration being suppressed) while predicting the movement of the vehicles in front in an effort to improve the fuel efficiency. Therefore, it is highly likely that the acceleration and deceleration becomes smooth even if a large inter-vehicle distance is not secured. Therefore, the inter-vehicle distance may not be increased excessively.

In the example described in the first embodiment, on a condition that the setting change of the target inter-vehicle distance Dt is made after the distance to a temporary stopping location has reached the predetermined distance DS, and that the inter-vehicle distance to the subsequent vehicle is determined to be short, the target inter-vehicle distance Dt in a case where the inter-vehicle distance to the subsequent vehicle is determined to be short may be set shorter than the target inter-vehicle distance Dt in a case where this inter-vehicle distance is determined not to be short.

In a case where the inter-vehicle distance to the subsequent vehicle is short as determined by a sensor, such as a camera or a range finding sensor, facing rearward from the own vehicle, the target inter-vehicle distance Dt may be set somewhat small. To put it in another way, in a case where the inter-vehicle distance to the subsequent vehicle is large, the target inter-vehicle distance may be set longer. This may mean that the acceleration and deceleration are performed smoothly with a large inter-vehicle distance secured before the own vehicle if no subsequent vehicle is approaching the own vehicle. Meanwhile, in a case where a subsequent vehicle is approaching, if a large inter-vehicle distance is secured before the own vehicle, the driver of the subsequent vehicle may feel uncomfortable. Therefore, the control may be performed in consideration of the psychological state of the driver of the subsequent vehicle by increasing the inter-vehicle distance by a small amount.

In the example described in the second embodiment, the target inter-vehicle distance Dt may be changed to the normal setting value MN, on a condition that the setting change of the target inter-vehicle distance Dt is made after the distance to a temporary stopping location has reached the predetermined distance DS, and that it has been recognized that the alarm at the railroad crossing determined to be the temporary stopping location is on.

When the alarm is on, not only the preceding vehicle but also the own vehicle may normally stop. In such a case, unnecessary control may not be performed, and it may be possible to prevent a state in which an unnecessarily large inter-vehicle distance is secured.

Thus far, some embodiments of the technology have been described. The technology is not limited to the specific examples described above, and various modification examples may be conceivable. The processing examples illustrated in FIGS. 5 and 8 are not limiting examples.

In addition, various calculation techniques for changing the setting of the target inter-vehicle distance Dt or various timings at which the setting of the target inter-vehicle distance Dt is changed are conceivable.

In FIGS. 3A, 3B, 6, 7B, and 7C, after the target inter-vehicle distance Dt is temporarily increased, the target inter-vehicle distance Dt is decreased linearly, but this is merely an example.

The target inter-vehicle distance Dt may be set longer at the point when the distance to a temporary stopping location has reached the predetermined distance DS, but it is not necessary that the target inter-vehicle distance Dt be changed stepwise, and the target inter-vehicle distance Dt may be changed gradually, for example but not limited to, linearly or in a curve.

In addition, after the target inter-vehicle distance Dt is increased at the point when the distance to a temporary stopping location has reached the predetermined distance DS, the target inter-vehicle distance Dt may be reduced linearly, in a curved manner, in a stepwise manner, or in a very rough stepwise manner, such as in two steps.

The driving assist controller 5 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the driving assist controller 5. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the driving assist controller 5 illustrated in FIG. 1.

It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle controlling apparatus comprising:
    a setting unit configured to set a target inter-vehicle distance, the target inter-vehicle distance being one of traveling conditions in auto cruise control, the auto cruise control being configured to control a speed of an own vehicle to satisfy the set traveling conditions; and
    an acquiring unit configured to acquire position information of a temporary stopping location on a traveling route on which the own vehicle travels,
    the setting unit being configured to,
    on a condition that the own vehicle travels to follow a preceding vehicle, and that the acquiring unit has acquired the position information of the temporary stopping location,
    make a setting change to make the target inter-vehicle distance greater than a normal setting value when a distance from the own vehicle to the temporary stopping location reaches a predetermined distance, and
    make a setting change to bring the target inter-vehicle distance closer to the normal setting value in accordance with the distance until the own vehicle reaches the temporary stopping location.

2. The vehicle controlling apparatus according to claim 1, wherein
    the setting unit is configured to,
    in a period excluding a period in which the own vehicle is at halt,
    set the target inter-vehicle distance greater than the normal setting value, and
    make a setting change in the target inter-vehicle distance after the distance has reached the predetermined distance in accordance with the distance and the speed of the own vehicle.

3. The vehicle controlling apparatus according to claim 2, wherein
    the setting unit is configured to, on a condition that the setting change in the target inter-vehicle distance is made after the distance has reached the predetermined distance, and that the preceding vehicle is determined to be a large-sized vehicle,
    make the target inter-vehicle distance in a case where the preceding vehicle is determined to be a large-sized vehicle smaller than the target inter-vehicle distance in a case where the preceding vehicle is determined not to be a large-sized vehicle.

4. The vehicle controlling apparatus according to claim 3, wherein
    the setting unit is configured to, on a condition that the setting change in the target inter-vehicle distance is made after the distance has reached the predetermined distance, and that an inter-vehicle distance to a following vehicle is determined to be short,
    make the target inter-vehicle distance in a case where the inter-vehicle distance is determined to be short smaller than the target inter-vehicle distance in a case where the inter-vehicle distance is determined not to be short.

5. The vehicle controlling apparatus according to claim 4, wherein
    the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

6. The vehicle controlling apparatus according to claim 3, wherein
    the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

7. The vehicle controlling apparatus according to claim 2, wherein
    the setting unit is configured to, on a condition that the setting change in the target inter-vehicle distance is made after the distance has reached the predetermined distance, and that an inter-vehicle distance to a following vehicle is determined to be short,
    make the target inter-vehicle distance in a case where the inter-vehicle distance is determined to be short smaller than the target inter-vehicle distance in a case where the inter-vehicle distance is determined not to be short.

8. The vehicle controlling apparatus according to claim 7, wherein
    the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

9. The vehicle controlling apparatus according to claim 2, wherein
    the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

10. The vehicle controlling apparatus according to claim 1, wherein
    the setting unit is configured to, on a condition that the setting change in the target inter-vehicle distance is made after the distance has reached the predetermined distance, and that an inter-vehicle distance to a following vehicle is determined to be short, make the target inter-vehicle distance in a case where the inter-vehicle distance is determined to be short smaller than the target inter-vehicle distance in a case where the inter-vehicle distance is determined not to be short.

11. The vehicle controlling apparatus according to claim 1, wherein the setting unit is configured to, on a condition that the setting change in the target inter-vehicle distance is made after the distance has reached the predetermined distance, and that the preceding vehicle is determined to be a large-sized vehicle, make the target inter-vehicle distance in a case where the preceding vehicle is determined to be a large-sized vehicle smaller than the target inter-vehicle distance in a case where the preceding vehicle is determined not to be a large-sized vehicle.

12. The vehicle controlling apparatus according to claim 11, wherein the setting unit is configured to, on a condition that the setting change in the target inter-vehicle distance is made after the distance has reached the predetermined distance, and that an inter-vehicle distance to a following vehicle is determined to be short, make the target inter-vehicle distance in a case where the inter-vehicle distance is determined to be short smaller than the target inter-vehicle distance in a case where the inter-vehicle distance is determined not to be short.

13. The vehicle controlling apparatus according to claim 12, wherein the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

14. The vehicle controlling apparatus according to claim 11, wherein the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

15. The vehicle controlling apparatus according to claim 10, wherein the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

16. The vehicle controlling apparatus according to claim 1, wherein the setting unit is configured to change the target inter-vehicle distance to the normal setting value, on a condition that the setting change in the target inter-vehicle distance is made after the distance has reached the predetermined distance, and that an alarm at a railroad crossing serving as the temporary stopping location is recognized as being on.

17. A vehicle controlling apparatus comprising circuitry configured to set a target inter-vehicle distance, the target inter-vehicle distance being one of traveling conditions in auto cruise control, the auto cruise control being configured to control a speed of an own vehicle to satisfy the set traveling conditions, and acquire position information of a temporary stopping location on a traveling route on which the own vehicle travels, the circuitry being configured to, on a condition that the own vehicle travels to follow a preceding vehicle, and that the position information of the temporary stopping location has been acquired, make a setting change to make the target inter-vehicle distance greater than a normal setting value when a distance from the own vehicle to the temporary stopping location reaches a predetermined distance, and make a setting change to bring the target inter-vehicle distance closer to the normal setting value in accordance with the distance until the own vehicle reaches the temporary stopping location.

\* \* \* \* \*